(12) United States Patent
Koma et al.

(10) Patent No.: US 8,022,695 B2
(45) Date of Patent: Sep. 20, 2011

(54) ROTATION ANGLE DETECTION DEVICE

(75) Inventors: Tetsuya Koma, Ishikawa (JP); Hideki Tsukaoka, Fukui (JP)

(73) Assignee: Panasonic Corporation, Osaka (JP)

( * ) Notice: Subject to any disclaimer, the term of this patent is extended or adjusted under 35 U.S.C. 154(b) by 471 days.

(21) Appl. No.: 12/178,124

(22) Filed: Jul. 23, 2008

(65) Prior Publication Data

US 2009/0066325 A1    Mar. 12, 2009

(30) Foreign Application Priority Data

Sep. 6, 2007   (JP) ................................. 2007-230961

(51) Int. Cl.
  *G01B 3/30*   (2006.01)
(52) U.S. Cl. .............. 324/207.25; 324/207.23; 324/200; 356/614
(58) Field of Classification Search .............. 324/207.21–207.25; 356/614–615
See application file for complete search history.

(56) References Cited

U.S. PATENT DOCUMENTS 7,145,130 B2 * 12/2006 Sano .......................... 250/231.15
7,532,005 B2 *  5/2009 Arakawa et al. ......... 324/207.25

FOREIGN PATENT DOCUMENTS

JP   2006-258625 A   9/2006

* cited by examiner

*Primary Examiner* — Huy Q Phan
*Assistant Examiner* — Trung Q Nguyen
(74) *Attorney, Agent, or Firm* — RatnerPrestia

(57) ABSTRACT

A rotation angle detection device includes a rotary body rotating in linked motion with a steering wheel; a detector rotating in linked motion with the rotary body; a magnetic detection element placed on a wiring board and detecting magnetism of a magnet placed at the detector; a control part for detecting a rotation angle of the rotary body based on a detection signal from the magnetic detection element; and a holder latched onto the wiring board and rotatably holding the detector.

1 Claim, 5 Drawing Sheets

ROTATION ANGLE DETECTION DEVICE

BACKGROUND OF THE INVENTION

1. Field of the Invention

The present invention relates to a rotation angle detection device used for detecting a rotation angle of a steering wheel of an automobile and the like.

2. Background Art

Recently, functions of an automobile have been enhanced. In such circumstances, automobiles using various rotation angle detection devices for detecting a rotation angle of a steering wheel and using this detected rotation angle to perform various controls of a vehicle have been increased.

Such a conventional rotation angle detection device is described with reference to FIGS. 4 and 5. FIG. 4 is a partial sectional view showing a conventional rotation angle detection device, and FIG. 5 is an exploded perspective view showing a conventional rotation angle detection device. In FIGS. 4 and 5, spur gear 111 is formed on the outer side surface of rotary body 101. Engaging part 112, which is engaged with a steering shaft (not shown) to be inserted, is provided at the center part of rotary body 101.

Spur gear 121 is formed on the outer side surface of first detector 102. Spur gear 131 is formed on the outer side surface of second detector 103. Spur gear 131 has a different number of cogs from that of spur gear 121. Spur gear 121 of first detector 102 meshes with spur gear 111 of rotary body 101. Furthermore, spur gear 131 of second detector 103 meshes with spur gear 121 of first detector 102.

Furthermore, wiring board 104 is disposed above first detector 102 and second detector 103 substantially in parallel thereto. A plurality of wiring patterns (not shown) is formed on the upper and lower surfaces of wiring board 104. Furthermore, magnetic detection elements 161 and 162 are placed on wiring board 104, respectively. Magnet 151 placed at the center of first detector 102 faces magnetic detection element 161. Magnet 152 placed at the center of second detector 103 faces magnetic detection element 162.

Thus, magnet 151 and magnetic detection element 161, which face each other, form a first detection part. Similarly, magnet 152 and magnetic detection element 162, which face each other, form a second detection part. Furthermore, wiring board 104 includes control part 107 coupled to magnetic detection elements 161 and 162 by an electronic component such as a microcomputer.

Furthermore, case 108 has a substantially box-shape and is made of insulating resin. Rotary body 101 is rotatably held in through-hole 181 of case 108. First detector 102 is rotatably held in hollow cylindrical part 182. Second detector 103 is rotatably held in hollow cylindrical part 183.

Furthermore, cover 109 has a substantially box-shape and is made of insulating resin. Cover 109 covers an opening part on the upper surface of case 108. Rotary body 101, first detector 102 and second detector 103 are rotatably held between case 108 and cover 109. Wiring board 104 is fixed and held to cover 109. Case 108 and cover 109 are coupled to each other with a plurality of screws 110. Thus, a conventional rotation angle detection device is configured.

In the thus configured rotation angle detection device, control part 107 is coupled to an electronic circuit of an automobile (not shown) via a connector, a lead wire (not shown), or the like. Furthermore, a steering shaft (not shown) is inserted in engaging part 112 of rotary body 101 to be placed on an automobile.

In the above-mentioned configuration, when a steering wheel is rotated, rotary body 101 latched onto a steering shaft is rotated. First detector 102 is rotated in linked motion with rotary body 101. Second detector 103 is rotated in linked motion with first detector 102. Therefore, magnets 151 and 152 placed respectively in the center of first and second detectors 102 and 103 are also rotated. Magnetic detection elements 161 and 162 detect the change in the magnetism of magnets 151 and 152 as a detection signal, respectively. At this time, the data waveforms of magnetic detection elements 161 and 162 are detection signals differing in cycle and phase from each other because the numbers of cogs are different and rotation speeds are also different between first detector 102 and second detector 103.

Then, control part 107 detects a rotation angle of rotary body 101, that is, a rotation angle of the steering wheel by executing a predetermined operation according to the two different detection signals and the numbers of cogs of first detector 102 and second detector 103. This detected rotation angle is output to an electronic circuit of an automobile, so that various controls of a vehicle are carried out.

During the above-mentioned rotation operation, first detector 102 and second detector 103 are rotated in a state in which they are held in hollow cylindrical parts 182 and 183 of case 108, respectively. However, in the manufacture of a device, when wiring board 104 fixed to cover 109 is fabricated into case 108 and cover 109 in a state in which it is displaced, a center displacement occurs between magnets 151, 152 of first and second detectors 102, 103 held in case 108 and magnetic detection elements 161, 162 placed on wiring board 104.

Furthermore, case 108, cover 109 and wiring board 104 are made of different materials and have different shapes from each other. Therefore, amounts of expansion or shrinkage differ from each other depending upon the temperature and humidity of the environment in which the device is used, in particular, when the device is used at high or low temperature. As a result, a center displacement is increased between magnet 151 and magnetic detection element 161, or between magnet 152 and magnetic detection element 162.

Such a center displacement occurring between magnet 151 and magnetic detection element 161 or between magnet 152 and magnetic detection element 162, when the device is fabricated or used at high or low temperature, is actually from about 0.1 to 0.5 mm. However, such a displacement causes an error in the magnetism of magnets 151 and 152 detected by magnetic detection elements 161 and 162. As a result, a rotation angle detected by control part 107 based on a predetermined operation may include an angle error of about 1° to 2°.

In this way, in the above-mentioned conventional rotation angle detection device, magnets 151 and 152 are placed in first and second detectors 102 and 103 which are held in case 108, respectively. Furthermore, magnetic detection elements 161 and 162 are placed on wiring board 104 fixed to cover 109, respectively. Therefore, when the device is fabricated or used at high or low temperature, the center displacement may occur between magnet 151 and magnetic detection element 161 or between magnet 152 and magnetic detection element 162, respectively. As a result, a detection error of a rotation angle may occur.

Note here that the prior art technique related to the invention of the present application is shown in, for example, Japanese Patent Unexamined Publication No. 2006-258625.

SUMMARY OF THE INVENTION

A rotation angle detection device of the present invention has the following configuration. The rotation angle detection device of the present invention includes a rotary body rotating in linked motion with a steering wheel; a detector rotating in linked motion with the rotary body; a magnetic detection element placed on a wiring board and detecting magnetism of a magnet placed at the detector; a control part for detecting a rotation angle of the rotary body based on a detection signal from the magnetic detection element; and a holder latched onto the wiring board and rotatably holding the detector.

With such a configuration, the rotation angle detection device of the present invention has an advantage that it is possible to realize a rotation angle detection device capable of detecting a rotation angle reliably with less error.

DETAILED DESCRIPTION OF PREFERRED EMBODIMENT

Hereinafter, the embodiment of the present invention is described with reference to drawings.

First Embodiment

Figure 1:
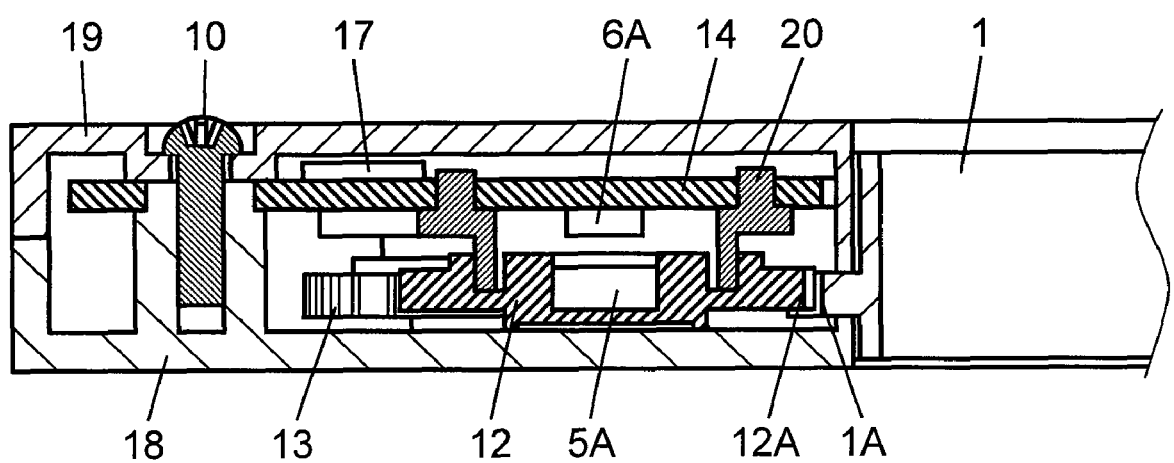
FIG. 1 is a partial sectional view showing a rotation angle detection device in accordance with a first embodiment of the present invention.
Figure 2:
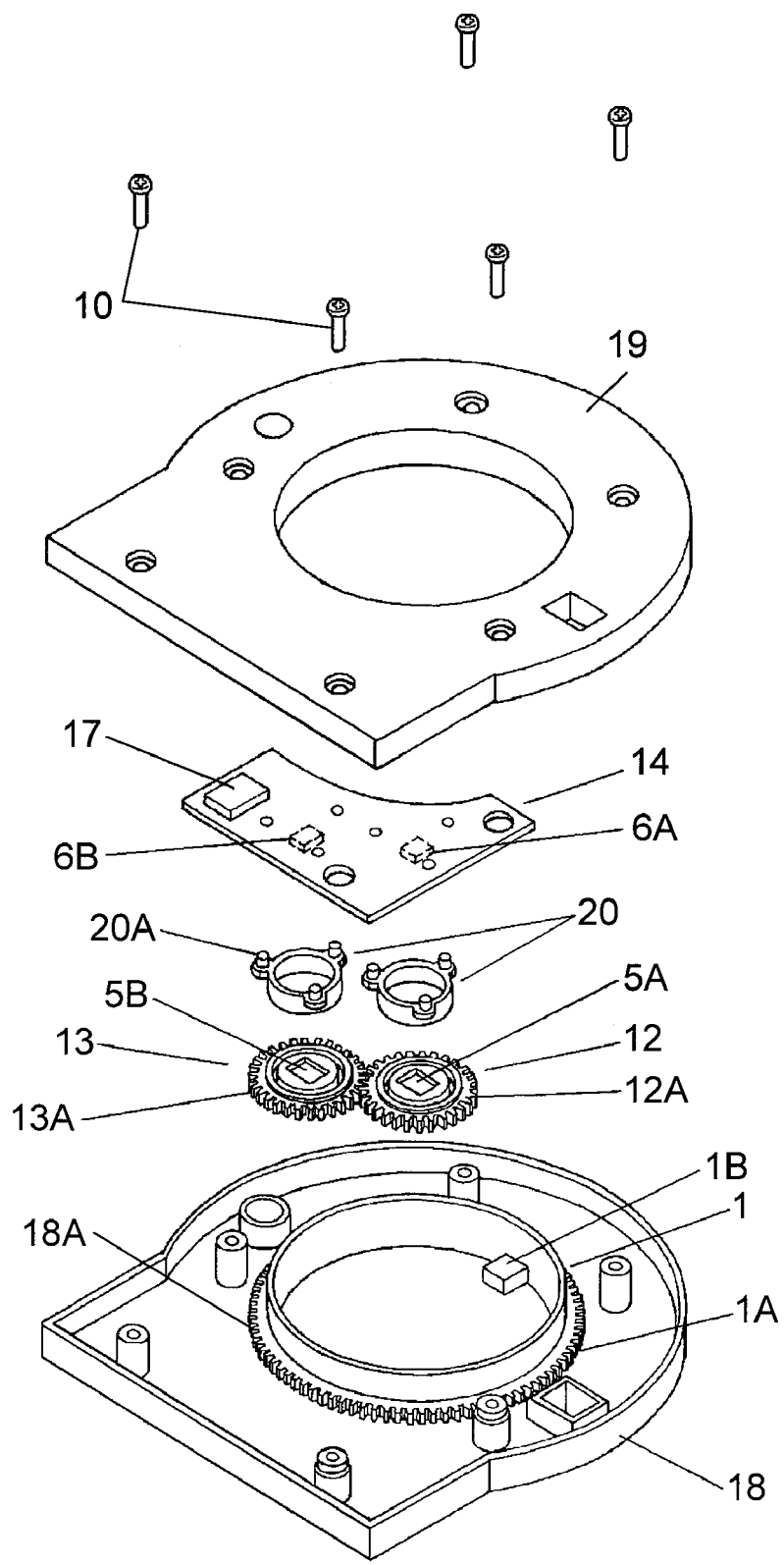
FIG. 2 is an exploded perspective view showing a rotation angle detection device in accordance with the first embodiment of the present invention.

FIG. 1 is a partial sectional view showing a rotation angle detection device in accordance with a first embodiment of the present invention. FIG. 2 is an exploded perspective view showing a rotation angle detection device in accordance with the first embodiment of the present invention.

Firstly, with reference to FIGS. 1 and 2, a basic configuration of the rotation angle detection device in accordance with the first embodiment is described. The rotation angle detection device in accordance with the first embodiment includes rotary body 1 rotating in linked motion with a steering wheel (not shown); detectors 12 and 13 rotating in linked motion with rotary body 1; magnetic detection elements 6A and 6B placed on wiring board 14 and detecting magnetism of magnets 5A and 5B placed in detectors 12 and 13; control part 17 for detecting a rotation angle of rotary body 1 based on a detection signal from magnetic detection elements 6A and 6B; and holders 20 latched onto wiring board 14 and rotatably holding detectors 12 and 13.

Next, similarly, with reference to FIGS. 1 and 2, the rotation angle detection device in accordance with the first embodiment is described in more detail. Rotary body 1 is made of insulating resin such as polyoxymethylene resin or a metal. Spur gear 1A is formed on the outer side surface of rotary body 1. Furthermore, engaging part 1B engaged with a steering shaft (not shown) to be inserted is provided in the center of rotary body 1.

Spur gear 12A is formed on the outer side surface of first detector 12. Spur gear 13A is formed on the outer side surface of second detector 13. Spur gear 13A has a different number of cogs from that of spur gear 12A. Spur gear 12A of first detector 12 meshes with spur gear 1A of rotary body 1. Spur gear 13A of second detector 13 meshes with spur gear 12A of first detector 12.

Spur gear 1A of rotary body 1 has the largest diameter and the number of cogs. The diameter and the number of cogs become smaller from spur gear 1A, to spur gear 13A of second detector 13 to spur gear 12A of first detector 12 sequentially in this order. For example, the number of cogs of spur gear 1A of rotary body 1 is 87, that of spur gear 13A of second detector 13 is 30, and that of spur gear 12 of first detector 12 is 29.

Furthermore, wiring board 14 is made of paper phenol, glass-containing epoxy, or the like. A plurality of wiring patterns (not shown) of, for example, copper foil are formed on the upper and lower surfaces of wiring board 14. Furthermore, wiring board 14 is disposed above first detector 12 and second detector 13 substantially in parallel thereto. First magnetic detection element 6A and second magnetic detection element 6B made of AMR (anisotropic magnetic resistance) element and the like are placed respectively on a surface which first magnet 5A placed at the center of first detector 12 and second magnet 5B placed at the center of second detector 13 are facing.

Thus, magnet 5A and magnetic detection element 6A, which face each other, form a first detection part. Similarly, magnet 5B and magnetic detection element 6B, which face each other, form a second detection part. Furthermore, wiring board 14 includes control part 17 coupled to magnetic detection elements 6A and 6B by an electronic component such as a microcomputer Furthermore, holder 20 has a substantially cylindrical shape and is made of insulating resin such as polybutylene terephthalate or ABS. First detector 12 and second detector 13 are rotatably held on the lower surfaces of two holders 20, respectively. Furthermore, two holders 20 are fixed and latched onto wiring board 14 by a plurality of protrusions 20A formed on the upper surfaces of holders 20.

Furthermore, case 18 has a substantially box-shape and is made of insulating resin such as polybutylene terephthalate or ABS. Cover 19 is also made of insulating resin. Cover 19 covers an opening part of the upper surface of case 18. Rotary body 1 is rotatably held in through-hole 18A of case 18. Wiring board 14 is fixed and held to cover 19. Case 18 and cover 19 are coupled to each other with a plurality of screws 10. Thus, a rotation angle detection device in accordance with the first embodiment is configured.

That is to say, first detector 12 having magnet 5A placed in its center and second detector 13 having magnet 5B placed in the center thereof are rotatably held in two holders 20, respectively. Two holders 20 are latched onto wiring board 14 on which magnetic detection elements 6A and 6B are placed. This reduces the center displacement between magnet 5A and magnetic detection element 6A, and the center displacement between magnet 5B and magnetic detection element 6B occurring when the device is fabricated.

That is to say, first detector 12 and second detector 13 are combined with two holders 20 directly, and two holders 20 are combined with wiring board 14 directly, not via case 18 and cover 19. Thereby, even when more or less position displacement occurs in components, the fabrication can be carried out with the center displacement between magnet 5A and magnetic detection element 6A, and the center displacement between magnet 5B and magnetic detection element 6B minimized.

In the thus configured rotation angle detection device, control part 17 is coupled to an electronic circuit of an automobile (not shown) via a connector, a lead wire (not shown), or the like. Furthermore, a steering shaft (not shown) is inserted in engaging part 1B of rotary body 1 to be placed on an automobile.

In the above-mentioned configuration, when a steering is rotated, rotary body 1 is also rotated. First detector 12 is rotated in linked motion with rotary body 1. Second detector 13 is rotated in linked motion with first detector 12. Therefore, magnets 5A and 5B placed at the center of first and second detectors 12 and 13 are also rotated. Magnetic detection elements 6A and 6B detect the change in the magnetism of magnets 5A and 5B as a detection signal, respectively. At this time, the data waveforms of magnetic detection elements 6A and 6B are detection signals differing in cycle and phase from each other because the numbers of cogs are different and rotation speeds are also different between first detector 12 and second detector 13.

Then, control part 17 detects a rotation angle of rotary body 1, that is, a rotation angle of the steering wheel by executing a predetermined operation according to the two different detection signals and the numbers of cogs from first detector 12 and second detector 13. This detected rotation angle is output to an electronic circuit of an automobile, so that various controls of a vehicle are carried out.

Note here that when the above-mentioned device is used, expansion or shrinkage may occur in the components due to heat or humidity depending upon the temperature or humidity of the environment in which the device is used, in particular, when the device is used at high or low temperature because the materials and shapes are different in components. However, as mentioned above, first detector 12 and second detector 13 are rotatably held in two holders 20, and holders 20 are latched onto wiring board 14. Thereby, the center displacement between magnet 5A and magnetic detection element 6A, and the center displacement between magnet 5B and magnetic detection element 6B can be kept small.

That is to say, first detector 12 and second detector 13, in which magnets 5A and 5B are placed respectively, are held in two holders 20 directly, not via case 18 and cover 19. Furthermore, similarly, two holders 20 are directly latched onto wiring board 14, on which magnetic detection elements 6A and 6B are placed respectively, not via case 18 and cover 19. Thus, even when more or less expansion and contraction occurs in components, the center displacement between magnet 5A and magnetic detection element 6A, and the center displacement between magnet 5B and magnetic detection element 6B are kept to be small. The device is configured so as to be able to detect a rotation angle with less error.

Second Embodiment

Figure 3:
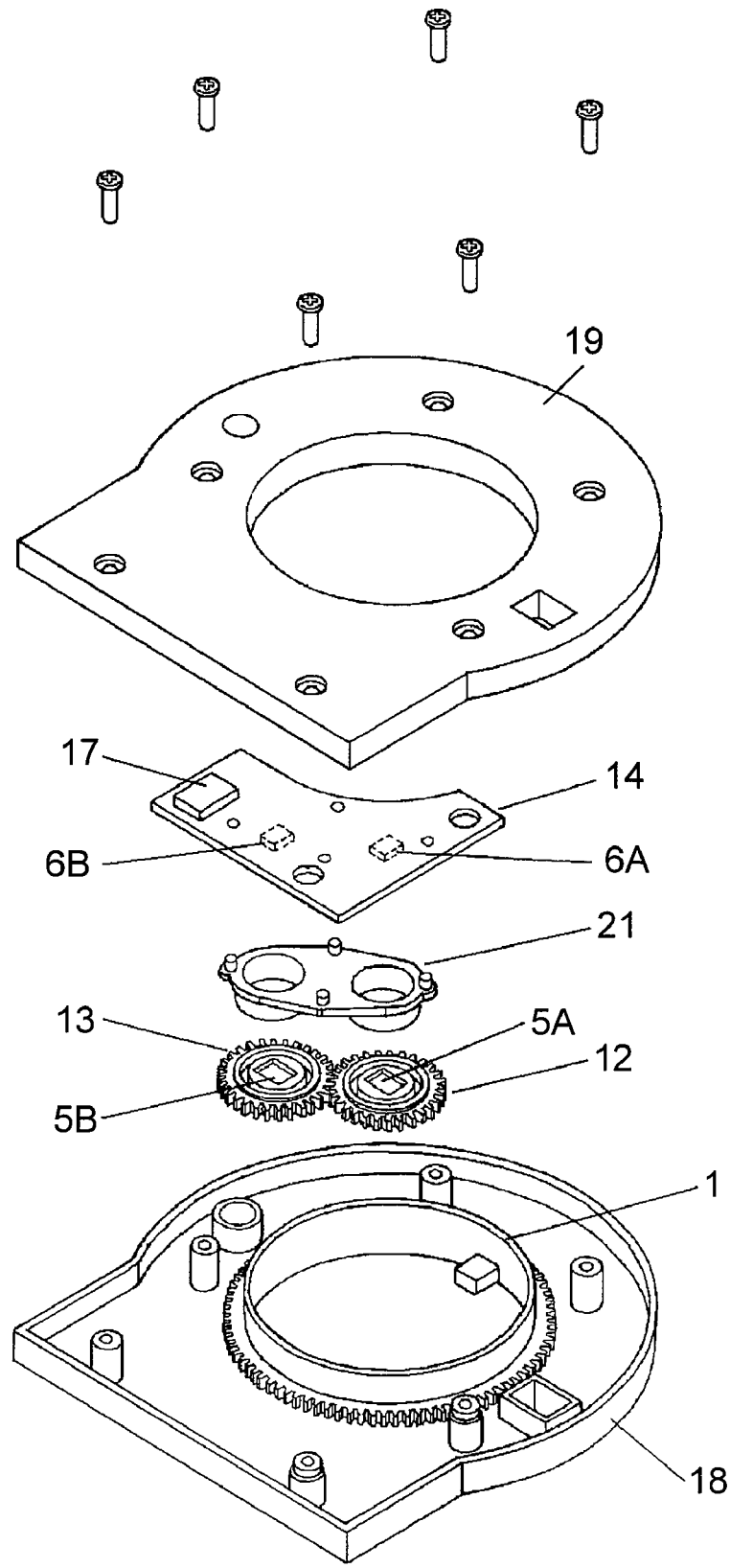
FIG. 3 an exploded perspective view showing a rotation angle detection device in accordance with a second embodiment of the present invention.
Figure 4:
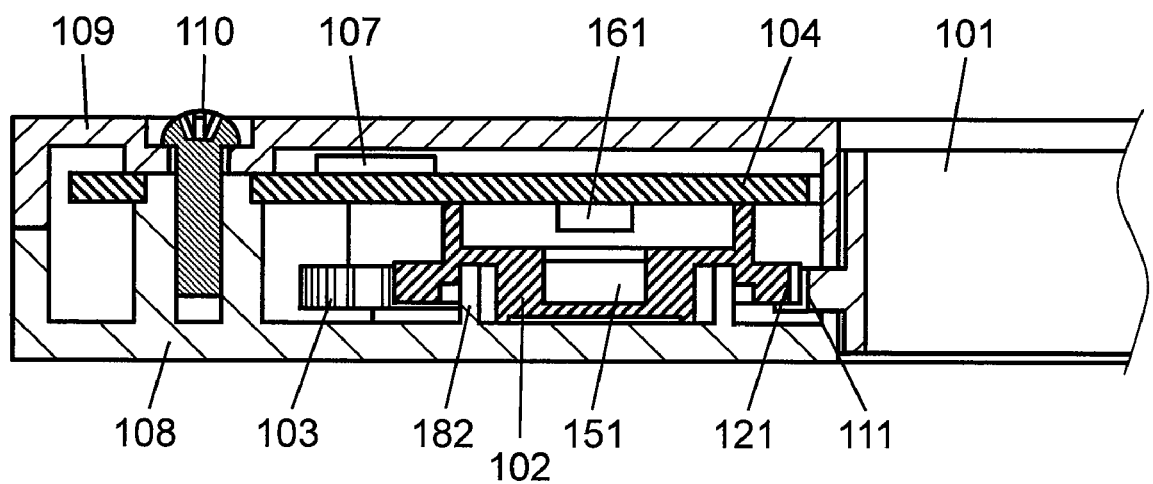
FIG. 4 is a partial sectional view showing a conventional rotation angle detection device.
Figure 5:
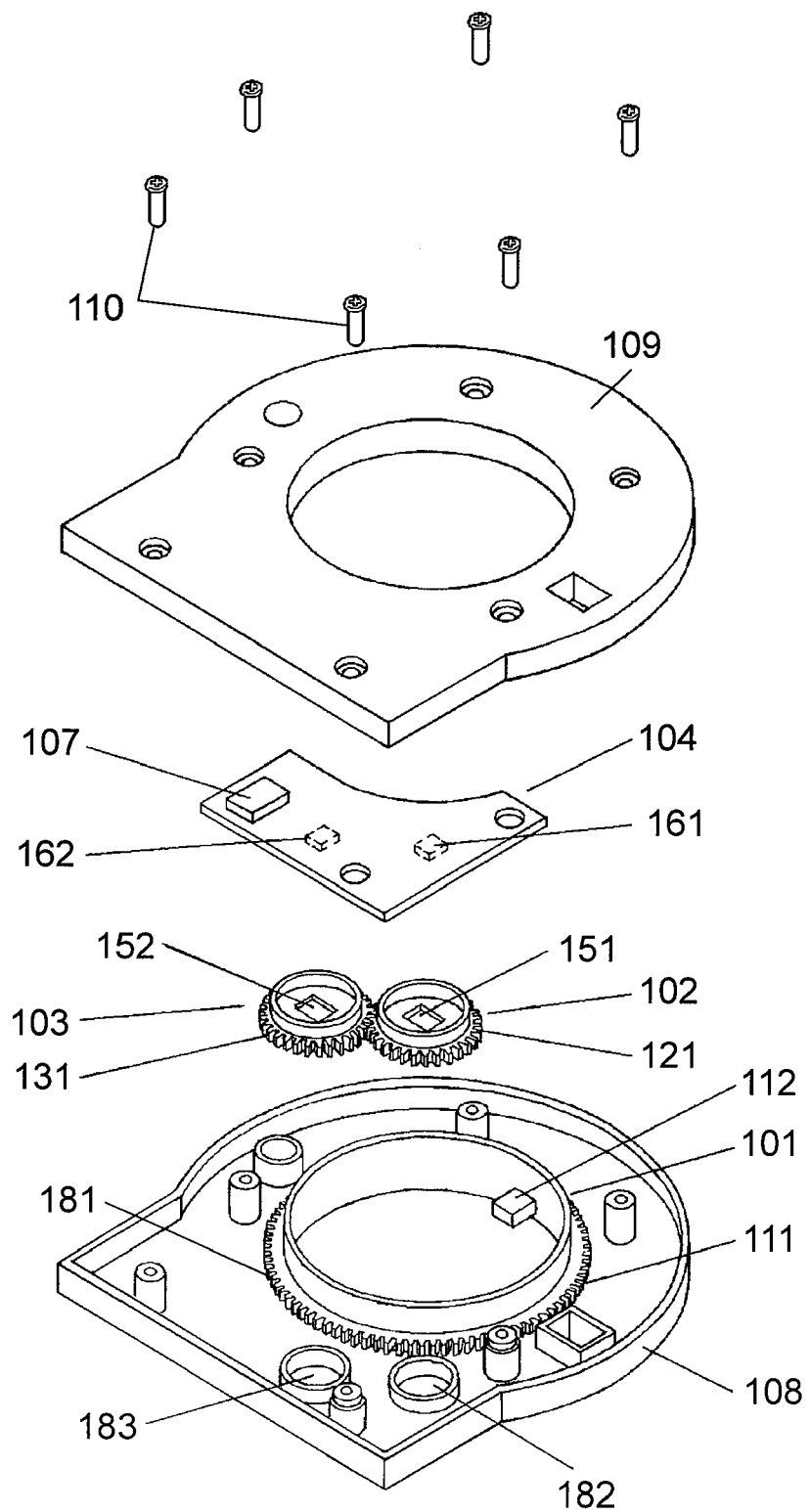
FIG. 5 is an exploded perspective view showing a conventional rotation angle detection device.

FIG. 3 is an exploded perspective view showing a rotation angle detection device in accordance with a second embodiment of the present invention. The second embodiment is different from the above-mentioned first embodiment in the following point. The second embodiment and the above-mentioned first embodiment are the same as each other except for the following different point.

That is to say, the above-mentioned first embodiment describes a configuration in which two holders 20 for rotatably holding first detector 12 and second detector 13 are provided separately. However, in the second embodiment, as shown in the exploded perspective view of FIG. 3, two holding portions are integrated to form one holder 21. First detector 12 and second detector 13 are rotatably held in two holding parts of holder 21, and holder 21 is latched onto wiring board 14. Thus, in the rotation angle detection device in accordance with the second embodiment, the number of components is reduced, thereby facilitating assembling the device. Furthermore, it is possible to further reduce the center displacement between magnet 5A and magnetic detection element 6A, and the center displacement between magnet 5B and magnetic detection element 6B occurring when the device is fabricated or when the device is used at high or low temperature.

As is apparent from the above description, in accordance with the embodiments, holders 20 or holder 21 capable of rotatably holding first detector 12 and second detector 13, in which magnets 5A and 5B are placed respectively, are provided. By latching holders 20 or holder 21 onto wiring board 14 on which magnetic detection elements 6A and 6B are placed respectively, first detector 12 and second detector 13 are held in holders 20 or holder 21. Since holders 20 or holder 21 is latched onto wiring board 14, it is possible to further reduce the center displacement between magnet 5A and magnetic detection element 6A, and the center displacement between magnet 5B and magnetic detection element 6B occurring when the device is fabricated or when the device is used at high or low temperature. Consequently, it is possible to obtain a rotation angle detection device capable of detecting a rotation angle reliably with less error.

In the configuration described above, gears of a rotary body and detectors mesh with each other so as to rotate them in linked motion with each other. Besides gears, for example, convex and concave portions or high friction portions may be formed on the outer periphery of the rotary body or the detector, so that they are rotated in linked motion with each other. In this case, the embodiments of the present invention can be carried out.

A rotation angle detection device in accordance with the present invention can reliably detect a rotation angle with less error, and is useful mainly for detecting a rotation angle of steering of an automobile.

What is claimed is:
1. A rotation angle detection device, comprising:
   a rotary body rotating in linked motion with a steering wheel;
   a detector rotating in linked motion with the rotary body;
   a magnetic detection element placed on a wiring board and detecting magnetism of a magnet placed at the detector;
   a control part for detecting a rotation angle of the rotary body based on a detection signal from the magnetic detection element; and
   a holder latched onto the wiring board and rotatably holding the detector,
   wherein the detector includes a first detector rotating in linked motion with rotation of the rotary body, and a second detector rotating in linked motion with rotation of the first detector, and
   the magnetic detection element includes a first magnetic detection element for detecting magnetism of the first magnet and a second magnetic detection element for detecting magnetism of the second magnet.

* * * * *